(12) United States Patent
Laha et al.

(10) Patent No.: US 10,664,217 B1
(45) Date of Patent: May 26, 2020

(54) DISPLAYING DYNAMIC CONTENT ON MULTIPLE DEVICES

(71) Applicant: International Business Machines Corporation, Armonk, NY (US)

(72) Inventors: Anirban Laha, Chinsurah (IN); Vijay Ekambaram, Chennai (IN); Parag Jain, Jabalpur (IN); Disha Shrivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/291,038

(22) Filed: Mar. 4, 2019

(51) Int. Cl.
*G06F 3/14* (2006.01)

(52) U.S. Cl.
CPC .................................. *G06F 3/1423* (2013.01)

(58) Field of Classification Search
CPC .... G06F 3/1423; G06F 3/0416; G06F 3/3208; G06F 3/147; G09G 3/36
See application file for complete search history.

(56) References Cited

U.S. PATENT DOCUMENTS

| | | |
|---|---|---|
| 6,493,008 B1 | 12/2002 | Yui |
| 6,690,337 B1 | 2/2004 | Mayer, III et al. |
| 7,091,926 B2 | 8/2006 | Kulas |
| 9,880,799 B1 | 1/2018 | Bertz et al. |
| 9,961,295 B2 * | 5/2018 | Takada .................. G06F 3/1446 |
| 2005/0168630 A1 | 8/2005 | Yamada et al. |
| 2008/0055189 A1 | 3/2008 | Wilk et al. |
| 2012/0050314 A1 | 3/2012 | Wang |
| 2014/0132833 A1 | 5/2014 | Wang et al. |
| 2016/0162240 A1* | 6/2016 | Gu ..................... H04N 21/4402 345/1.3 |
| 2018/0181252 A1 | 6/2018 | Park et al. |

FOREIGN PATENT DOCUMENTS

IN 201741009647 A 9/2018

OTHER PUBLICATIONS

Unknown, "HeadPhones: Ad Hoc Mobile Multi-Display Environments through Head Tracking", printed Jan. 18, 2019, 2 pages.
TimG, "What if all your mobile devices formed a single screen?", The Story of Swip.js, freeCodeCamp, Jun. 20, 2017, 20 pages.
Furman, M., "Play One Video Across Multiple Device Screens with Chappiecast", Mar. 2, 2016, 4 pages.
Victor H., "iPhones score highest touch responsiveness, more than twice as responsive as Android and Windows Phone devices", Oct. 1, 2013, 4 pages.
Mell et al., "The NIST Definition of Cloud Computing", Recommendations of the National Institute of Standards and Technology, Sep. 2011, 7 pages.

* cited by examiner

*Primary Examiner* — Stacy Khoo
(74) *Attorney, Agent, or Firm* — Stosch Sabo

(57) ABSTRACT

Aspects of the present disclosure relate to techniques for presenting content on a plurality of devices. The techniques including determining a first configuration for displaying first content on a plurality of devices, where the first configuration is based on a collective viewing size, an aspect ratio, a resolution shift, an internal border area, and a tactile quality gradient. The techniques including displaying, on a first device of the plurality of devices, a first device identifier, an orientation indicator, and an adjacent device identifier.

20 Claims, 7 Drawing Sheets

DISPLAYING DYNAMIC CONTENT ON MULTIPLE DEVICES

BACKGROUND

The present disclosure relates to displays, and, more specifically, to techniques for displaying content across multiple displays.

Multiple devices can be situated adjacent to one another and content presented on the multiple devices as if the multiple devices were a single device. Using multiple devices to display content can enable content to be displayed at a larger scale than if displayed across any single screen of the multiple devices.

SUMMARY

Aspects of the present disclosure are directed toward a computer-implemented method comprising determining a first configuration for displaying first content on a plurality of devices. In embodiments, the first configuration is based on a collective viewing size of the first configuration, an aspect ratio of the first configuration, a resolution shift of the first configuration, an internal border area of the first configuration, and a tactile quality gradient of the first configuration. The method further comprises displaying guidelines on respective devices of the plurality of devices for arranging the plurality of devices in the first configuration. The displaying guidelines includes displaying, on a first device of the plurality of devices, a first device identifier, an orientation indicator, and an adjacent device indicator, where the adjacent device indicator includes another device identifier and is located near a first border of the first device that is adjacent to another border of the other device in the first configuration.

Additional aspects of the present disclosure are directed towards a system comprising a plurality of devices arranged in a first configuration for displaying content on the plurality of devices. The plurality of devices including a first device having a first width and a first length situated adjacent to a second device having a second width less than the first width and a second length less than the first length. According to the system, the first device presents a first device identifier, a first orientation indicator, and a first adjacent device indicator, where the first adjacent device indicator includes a second device identifier corresponding to the second device, and where the first adjacent device identifier is situated at a first border of the first device that is adjacent to a second border of the second device. Further according to the system, the second device presents the second device identifier, a second orientation indicator, and a second adjacent device identifier, where the second adjacent device identifier includes the first device identifier, and where the second adjacent device identifier is situated at the second border of the second device that is adjacent to the first border of the first device.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1B:
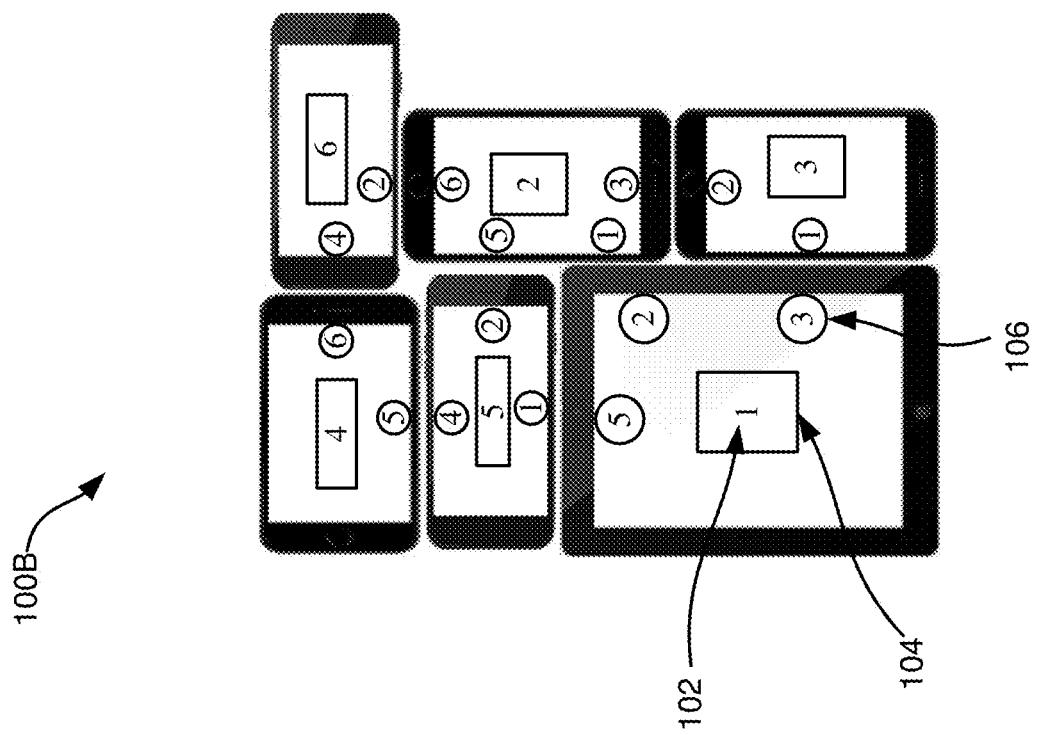
FIG. 1B illustrates a diagram of a set of devices presenting guidelines for orienting the set of devices in a first configuration, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward displays, and, more specifically, to techniques for displaying content across multiple displays. While not limited to such applications, embodiments of the present disclosure may be better understood in light of the aforementioned context.

Multiple devices can be arranged adjacent to one another and have content displayed across the multiple devices as though the multiple devices are a single device. Presenting content on a collective screen made up of multiple devices is associated with numerous technical challenges.

A first technical challenge associated with displaying content across multiple devices is determining a beneficial configuration of the multiple devices to appropriately display the content. Current solutions attempt to maximize a collective screen size for a given orientation (e.g., landscape or portrait). However, there are many factors beyond collective screen size that should be considered when determining an appropriate configuration for the multiple devices. Advantageously, aspects of the present disclosure evaluate numerous parameters to identify an appropriate configuration. The numerous parameters can relate to increasing viewing screen size, approaching an ideal aspect ratio, reducing an internal border area, reducing a resolution shift between adjacent devices, and improving touch sensitivity for heavily used portions of the collective screen, among others.

A second technical challenge associated with displaying content across multiple devices regards efficiently identifying an appropriate configuration of multiple devices given hundreds or thousands of possible configurations for the multiple devices. One solution is a brute force approach, whereby a score accounting for all parameters is calculated for each possible configuration of the multiple devices. However, this solution is highly inefficient as the number of possible configurations increases exponentially as a function of the number of devices. Another solution is a greedy solution, whereby a single parameter is optimized by finding a configuration that maximizes or minimizes a given parameter. However, this solution does not appropriately account for numerous parameters and can result in highly unbalanced configurations (e.g., a large screen size with an abnormal aspect ratio, a minimal resolution shift but with excessive internal border area, etc.).

Aspects of the present disclosure overcome this second technical challenge by providing techniques for efficiently identifying a configuration that balances several parameters, thus resulting in a highly usable collective screen area. Aspects of the present disclosure efficiently determine an appropriate configuration by identifying a greedy solution for numerous parameters, and then performing local replacements in each of the greedy solutions. Doing so reduces the evaluated number of configurations relative to all possible configurations and focuses on the configurations with an increased likelihood of producing a usable collective screen.

A third technical challenge relates to providing instructions to enable a user to arrange multiple devices in a desired configuration. Aspects of the present disclosure overcome this third technical challenge by providing effective instructions enabling a user to efficiently arrange multiple devices in a given configuration by presenting device identifiers, orientation indicators, and/or adjacent device identifiers on the multiple devices in order to indicate the orientation of each device and each device's proximal relationship to other devices of the multiple devices.

A fourth technical challenge relates to customizing interactive content to accommodate the imperfections inherent in a collective screen comprising multiple devices. Aspects of the present disclosure address this fourth technical challenge by modifying content for display on the given configuration of multiple devices. For example, the content can be modified by adjusting a size or aspect ratio of the content to appropriately fit a collective display of the multiple devices. As another example, aspects of the present disclosure can adjust a location of subtitles to a portion of the collective screen unbroken by an internal border. As another example, aspects of the present disclosure can modify interactive content so that items a user is interacting with, or predicted to interact with, remain in a visible and accessible portion of the collective screen.

Thus, embodiments of the present disclosure are directed to improved content display across multiple devices at least insofar as various aspects of the present disclosure (i) identify and objectively evaluate multiple parameters relating to quality of multi-device displays, (ii) efficiently compute an appropriate configuration, (iii) provide instructions enabling a user to efficiently arrange the multiple devices in the appropriate configuration, and/or (iv) modify the content to improve the usability and viewability of the content on the multi-device display.

The aforementioned advantages are example advantages, and embodiments of the present disclosure exist that can contain all, some, or none of the aforementioned advantages while remaining within the spirit and scope of the present disclosure.

Figure 1A:
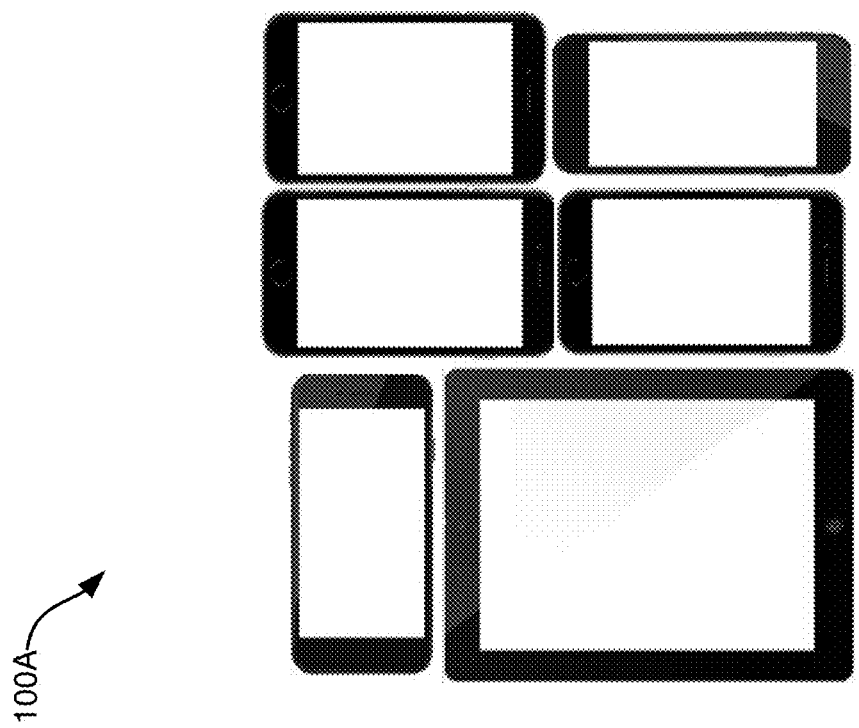
FIG. 1A illustrates a diagram of a set of devices in a random configuration, in accordance with embodiments of the present disclosure.

Referring now to FIG. 1A, illustrated is a plurality of devices in a random configuration 100A. The plurality of devices can include, for example, tablets, smart phones, mobile phones, e-readers, portable game consoles, displays, screens, monitors, and/or other devices capable of visually presenting data to a user. Random configuration 100A can be a configuration a user may believe is an optimal configuration due to its approximate rectangular shape, however, as discussed, there are numerous factors that influence presenting content on multiple displays, and while the random configuration 100A may be well-suited dimensionally, it may be inadequate for presenting content due to other metrics such as aspect ratio, internal borders, resolution shifts, viewing size, touch sensitivity, and/or other factors.

While FIG. 1A illustrates six devices of varying sizes, aspects of the present disclosure are relevant to any number of devices, with any number of variations in size between respective devices. For example, aspects of the present disclosure can be particularly useful for larger numbers of devices with a wider array of screen sizes (e.g., three or more devices, where two or more devices have different screen dimensions).

Referring now to FIG. 1B, illustrated is the plurality of devices of FIG. 1A arranged in a first configuration 100B, in accordance with embodiments of the present disclosure. The first configuration 100B is a configuration determined according to one or more factors such as, but not limited to, an aspect ratio of the first configuration 100B, internal borders of the first configuration 100B, changes in resolution between respective devices in the first configuration 100B, a viewing size of the first configuration 100B, and touch sensitivity of respective devices in the first configuration 100B. The calculations used to determine the first configuration 100B are discussed in more detail hereinafter with respect to FIGS. 2-4.

As further shown in FIG. 1B, the first configuration 100B presents guidelines (e.g., indications, indicators, instructions, markings, etc.) on respective devices enabling a user to properly arrange the plurality of devices in the first configuration 100B. The guidelines can include, for example, a device identifier 102 (e.g., 1, 2, 3, 4, 5, and 6 shown in the approximate center of each device), an orientation indicator 104 (e.g., a rectangle illustrating a portrait or landscape orientation relative to the orientation of the device identifier 102), and one or more adjacent device identifiers 106 (e.g., a circle including a device identifier of a device adjacent to a border on which the adjacent device identifier 106 is located).

Numerous alternatives to the example device identifier 102, orientation indicator 104, and adjacent device identifiers 106 are within the spirit and scope of the present disclosure.

Regarding device identifiers 102, the device identifiers 102 can be numeric, textual, alphanumeric, pictographic, color-based, design-based, image-based, or a different device identifier. Device identifiers 102 can be on any portion of the screen or extend across the entirety of the screen.

Regarding orientation indicators 104, the orientation indicators 104 can be a rectangle indicating portrait or landscape orientation, a bidirectional arrow indicating a portrait or landscape orientation, a textual indication of portrait or landscape orientation, or a different mechanism for indicating an orientation of a device. In some embodiments the orientation indicator 104 is incorporated into the device identifier 102 insofar as a numeric or textual device identifier 102 is inherently associated with an orientation (e.g., the orientation that the device identifier 102 can be read). Orientation indicators 104 can be positioned anywhere on the screen.

Regarding adjacent device identifiers 106, the adjacent device identifiers 106 can include the variations discussed above with respect to device identifiers 102 (e.g., numeric, textural, alphanumeric, pictographic, color-based, design-based, image-based, etc.). Furthermore, although the adjacent device identifiers 106 are shown in circles, the adjacent device identifiers 106 can also comprise rectangles or lines useful for indicating an extent of an overlap. Such a solution can be particularly useful in situations where multiple devices are adjacent to a same edge of another device (e.g., where devices 2 and 3 each partially overlap a border of device 1).

Additionally, instead of device identifiers 102, orientation indicators 104, and adjacent device identifiers 106, alternative embodiments can include all three of the aforementioned functionalities by presenting a portion of an image on each device, where the image is completed by properly arranging the devices relative to one another (e.g., a puzzle).

Furthermore, although not shown in FIG. 1B, the first configuration 100B can include additional indications for indicating when two or more devices are properly situated with respect to one another, and/or when all devices are properly aligned in the first configuration 100B. For example, when two or more devices are properly arranged, each screen may flash green, a check mark can appear on each device, and/or different indications can be made that are useful for acknowledging that two or more devices are properly situated with respect to each other. Providing indications of proper relative alignment is useful in improving the speed that a user can properly orient the plurality of devices in a given configuration.

In embodiments, the plurality of devices illustrated in the first configuration 100B can be communicatively coupled to one another by a wireless network or a short-range network. In alternative embodiments, each of the plurality of devices are communicatively coupled to a remote server, and thus indirectly coupled to one another via the remote server.

FIGS. 1A and 1B are illustrated for ease of discussion and are not to be taken in a limiting sense. Each embodiment of the present disclosure does not necessarily require each component discussed in FIGS. 1A and/or 1B. Likewise, embodiments of the present disclosure can exist that include more or fewer components than those components illustrated in FIGS. 1A and/or 1B. Furthermore, the configuration of the components in FIG. 1A and/or 1B are not limiting, and embodiments exist that include similar or dissimilar components arranged in similar or alternative configurations than the configurations shown.

Figure 2:
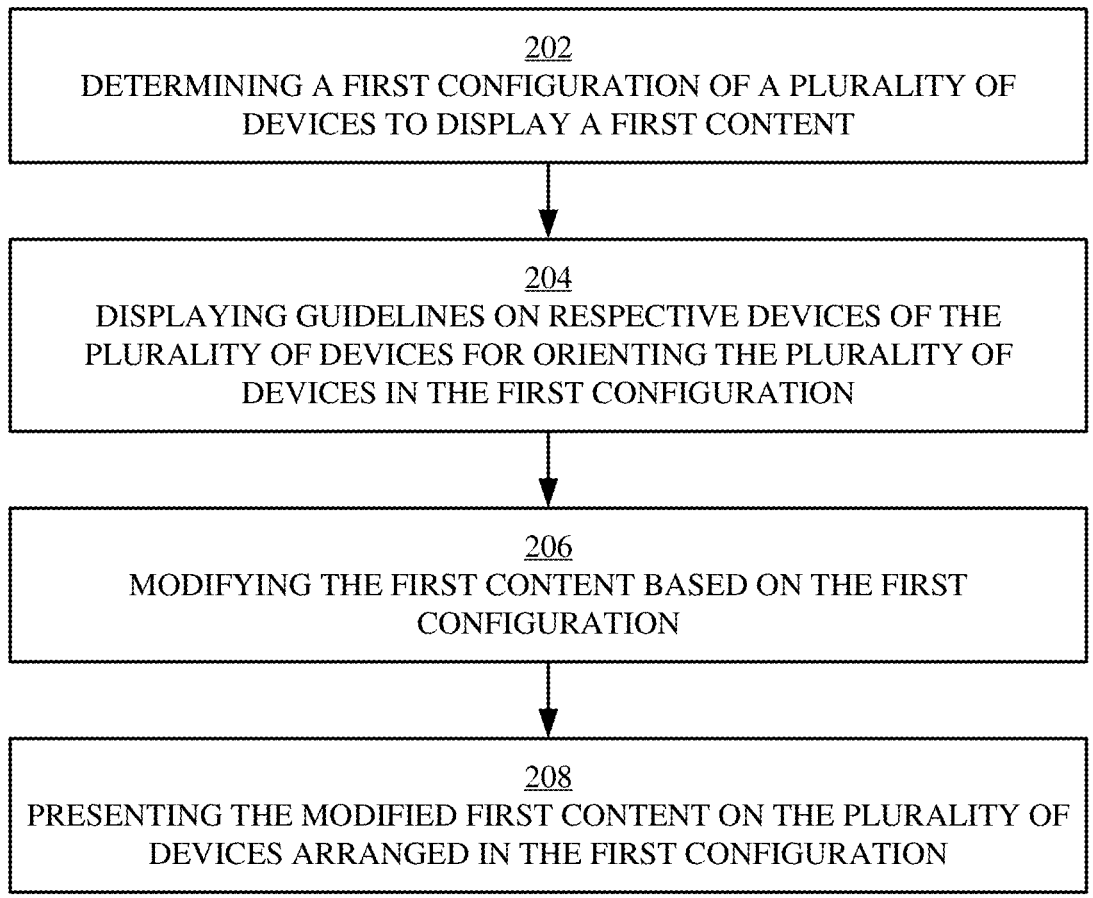
FIG. 2 illustrates a flowchart of an example method for presenting dynamic content on a plurality of devices, in accordance with embodiments of the present disclosure.

Referring now to FIG. 2, illustrated is a flowchart of an example method 200 for presenting content on a plurality of devices, in accordance with embodiments of the present disclosure. In various embodiments, the method 200 is implemented by a processor executing computer-readable program instructions, or the method 200 is implemented by a configuration manager (e.g., configuration manager 500 of FIG. 5), or the method 200 is implemented by a different configuration of hardware and/or software.

Operation 202 includes determining a first configuration of a plurality of devices to display a first content. The plurality of devices can be consistent with the plurality of devices discussed in FIGS. 1A and 1B, and including devices such as, but not limited to, tablets, smart phones, mobile phones, e-readers, portable game consoles, displays, screens, monitors, and/or other devices capable of visually presenting data to a user. The first content can be any content displayable on electronic devices such as, but not limited to, videos, video games, pictures, infographics, text, apps, maps, interactive content, and/or other content. Determining the first configuration from any number of possible configurations is discussed in more detail hereinafter with respect to FIGS. 3 and 4. Determining the first configuration can be based on, for example, one or more factors such as, but not limited to, an aspect ratio of the first configuration relative to an aspect ratio of the first content, an internal border area of the first configuration, changes in resolution between adjacent devices in the first configuration, a collective viewing size of the first configuration, and/or a tactile quality gradient of the first configuration based on touch sensitivities of respective devices.

Operation 204 includes displaying guidelines on respective devices of the plurality of devices for orienting the plurality of devices in the first configuration. Guidelines (e.g., indications, indicators, identifiers, instructions, markings, etc.) can include device identifiers (e.g., device identifiers 102 of FIG. 1B), orientation indicators (e.g., orientation indicators 104 of FIG. 1B), and/or adjacent device identifiers (e.g., adjacent device identifiers 106 of FIG. 1B). Displaying guidelines can enable a user to efficiently arrange the plurality of devices in the first configuration.

Operation 206 includes modifying the first content based on the first configuration of the plurality of devices. Modifying the first content can comprise any number of modifications such as, but not limited to, modifying an aspect ratio of the first content, modifying a size of the first content, modifying positions of subtitles in the first content, modifying locations of menus, icons, or other interactive media presented in the first content, and so on. Modifications to the first content can be made at the metadata level or at the data level using any content modification techniques now known or later developed.

Operation 208 includes presenting the modified first content on the plurality of display devices arranged in the first configuration.

The aforementioned operations can be completed in orders other than the order shown, and some operations can be completed in parallel with other operations. Additionally, embodiments exist including all, some, or none of the aforementioned operations while remaining within the spirit and scope of the present disclosure. For example, in some embodiments, the first content is not modified, and the unmodified first content is presented on the plurality of devices in the first configuration.

Figure 3:
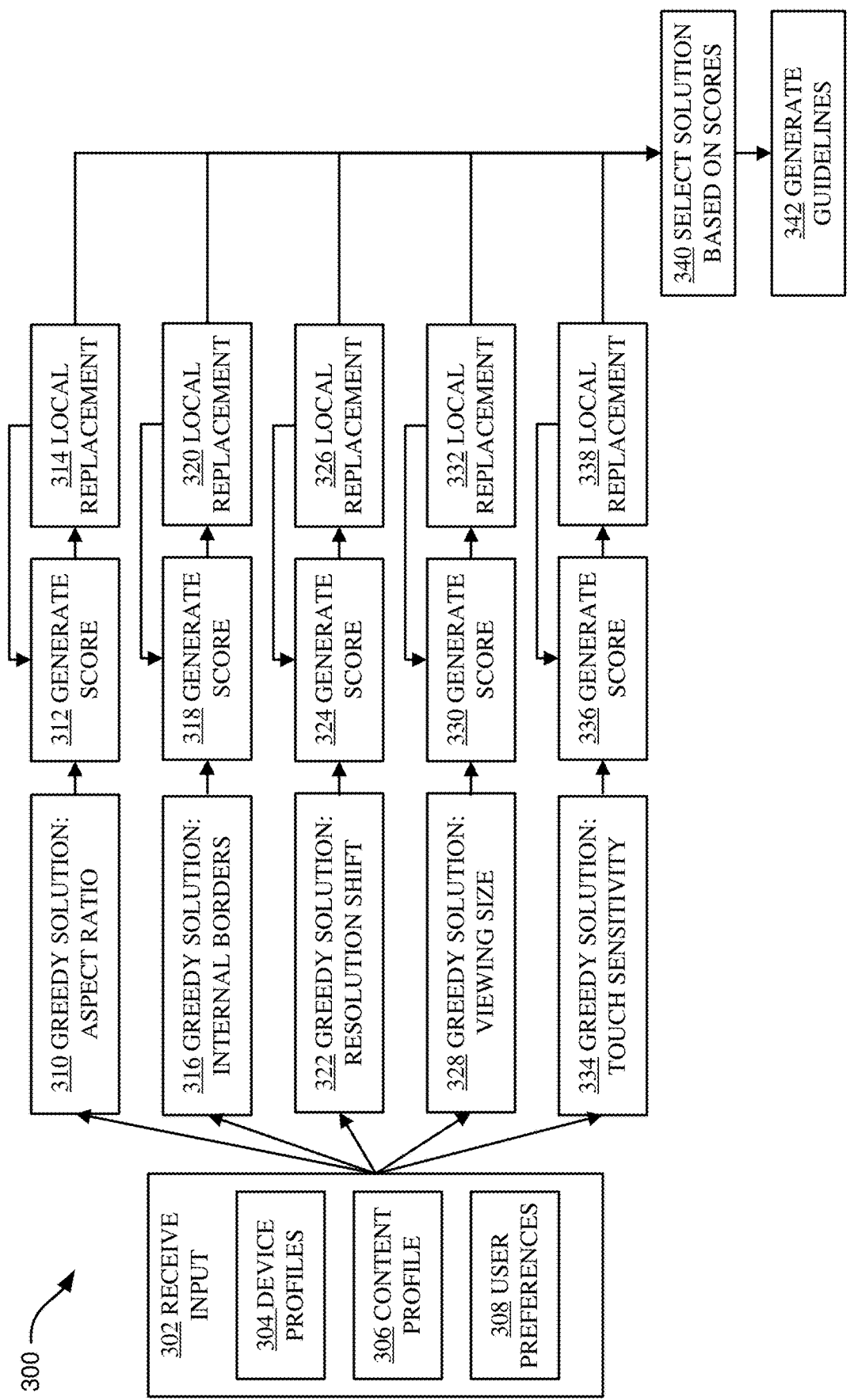
FIG. 3 illustrates a flowchart of an example method for determining a configuration of a plurality of devices using parallel processing, in accordance with embodiments of the present disclosure.

FIG. 3 illustrates a flowchart of an example method 300 for determining an appropriate configuration for a plurality of devices using parallel processing, in accordance with embodiments of the present disclosure. In some embodiments, the method 300 is a sub-method of operation 202 of FIG. 2. The operations of FIG. 3 can be implemented by a processor executing computer-readable program instructions, by a configuration manager (e.g., configuration manager 500 of FIG. 5), or by a different configuration of hardware and/or software. The method 300 can be implemented in a parallel processing system (e.g., a virtual machine, a symmetric multiprocessor, etc.) capable of executing numerous calculations in parallel. Thus, the method 300 can be particularly useful for reaching a desired configuration in a short period of time relative to iterative methods. However, the method 300 may also require additional computational capability relative to iterative methods.

Operation 302 includes receiving input such as, but not limited to, device profiles 304, a content profile 306, and user preferences 308. Each device of a plurality of devices can be associated with a respective device profile 304. Device profiles 304 can include information such as, but not limited to, a type of device, a model of a device, a screen size and/or border sizes of a device, an aspect ratio of a device, a resolution of a device, touch sensitivity capability of a device (e.g., Minimum App Response Time (MART) values), and so on.

The content profile 306 can include information such as, but not limited to, a resolution of the content, an aspect ratio of the content, a type of content (e.g., image, video, video game, etc.), critical viewable portions of content (e.g., an obstacle in a video game, subtitles in a video, faces in an image, etc.), interactive portions of content (e.g., menus, icons, buttons, etc.), and so on.

The user preferences 308 can include user preferences regarding viewing size, internal borders, aspect ratio, types of usability, and so on. In some embodiments, user preferences 308 are used to respectively weight different parameters (e.g., aspect ratio, viewing size, internal borders, resolution, touch sensitivity, and so on) relative to one another in order to customize a configuration to a user's preferences. In some embodiments, user preferences 308 are derived from previous (e.g., historical) multi-device configurations utilized by the user.

The method 300 uses input received in operation 302 to generate greedy solutions for each of a plurality of parameters such as a greedy aspect ratio solution 310 (e.g., a configuration of the plurality of devices having an aspect ratio approximating a desired aspect ratio relative to other configurations), a greedy border solution 316 (e.g., a configuration of the plurality of devices reducing an internal border area relative to other configurations), a greedy resolution shift solution 322 (e.g., a configuration of the plurality of devices reducing changes in resolution between adjacent devices relative to other configurations), a greedy viewing size solution 328 (e.g., a configuration of the plurality of devices increasing a viewing size relative to other configurations), and/or a greedy touch sensitivity solution 334 (e.g., a configuration of the plurality of devices having improved touch responsiveness in highly utilized portions of the collective screen relative to other configurations).

The greedy aspect ratio solution 310 can be calculated based on an aspect ratio associated with the content and included in content profile 306. For example, if content profile 306 includes an aspect ratio M:N=Y, the greedy aspect ratio solution 310 identifies a configuration of the plurality of devices having an aspect ratio approaching Y. Greedy aspect ratio solution 310 can calculate, for numerous configurations, a minimum height of the display area for a given configuration (e.g., denoted A), a minimum width of the display area for a given configuration (e.g., denoted B), and an aspect ratio for the given configuration (e.g., X=A/B) where X is the quotient of the minimum height divided by the minimum width. A score for the aspect ratio can then be calculated based on Equation 1:

$$\Delta_{aspect\_ratio\ (AR)} = abs(X-Y) \qquad \text{Equation 1:}$$

In Equation 1, X is the aspect ratio for the given configuration, and Y is the desired aspect ratio according to the content profile 306. An absolute value of the difference can be determined to negate complicating effects of negative numbers. Additional functions can be applied to Equation 1 to generate higher scores for configurations having aspect ratios closer to the desired aspect ratio (e.g., an inverse function such as an inverse exponential function such as $exp(-\Delta_{AR})$). Greedy aspect ratio solution 310 can be the configuration minimizing Equation 1 relative to other configurations. Although an absolute value is discussed above in Equation 1, alternative embodiments can take a square of the difference rather than an absolute value of the difference.

The greedy internal borders solution 316 can be calculated by subtracting a total external border area of a plurality of devices in a respective configuration (e.g., denoted E) from a total border area of all devices in the respective configuration (e.g., denoted T) to determine an internal border area for the respective configuration (e.g., denoted I). In other words, total internal border area I can be calculated by, for example, Equation 2:

$$\text{Cumulative Internal Border Area } (I) = T-E \qquad \text{Equation 2:}$$

According to Equation 2, a lower score represents a better configuration (e.g., less internal border area). In some embodiments, Equation 2 can be modified to generate a larger score as a result of a smaller internal border area (e.g., an inverse function such as an inverse exponential function such as $exp(-I)$). Border areas can be calculated based on data from device profiles 304. Device profiles 304 can include, for each device, a border area of each side of each device. Greedy internal borders solution 316 can be the configuration that minimizes Equation 2 relative to other configurations.

Although border areas are discussed above, alternative embodiments can calculate a total internal border length rather than a total internal border area. Calculating a total internal border length, although less precise than a total internal border area, requires less device information and can be done more expeditiously than calculating a total internal border area.

The greedy resolution shift solution 322 can be calculated by summing the resolution shift between respective pairs of adjacent devices in a given configuration. In other words, greedy resolution shift solution 322 can be calculated according to Equation 3:

$$\text{Cumulative Resolution Shift } (RS) = \Sigma_{i \in N} \Sigma_{j \in \nu} (r_i - r_j)^2 \qquad \text{Equation 3:}$$

In Equation 3, i can identify individual devices in a plurality of devices N, j can identify adjacent devices to a given device i, $r_i$ can be the resolution of the device i, and $r_j$ can be the resolution of the adjacent device j. As the resolution shift calculated by Equation 3 decreases, the display of the content on the plurality of devices improves as adjacent devices have relatively smaller differences in resolution. In some embodiments, an inverse, or other function is applied to Equation 3 in order to generate higher scores for lower resolution shifts. Greedy resolution shift solution 322 can be the configuration that minimizes Equation 3 relative to other configurations.

Although Equation 3 takes the square of differences, alternative embodiments can instead take an absolute value of the difference. Likewise, although Equation 3 calculates the cumulative resolution shift, alternative embodiments can find a maximum resolution shift between any two adjacent devices and base any score on the maximum resolution shift. Alternative embodiments can calculate the average resolution shift between adjacent devices rather than the cumulative resolution shift between all adjacent devices and use the average resolution shift in calculating a score related to resolution shift.

The greedy viewing size solution 328 can be calculated by determining a viewing size of a given configuration based on a minimum height of the given configuration (e.g., denoted A) multiplied by a minimum width of the given configuration (e.g., denoted B). In other words, Equation 4 can be used to calculate a viewing size of a given configuration:

Viewing Size (VS)=$A*B$  Equation 4:

The greedy viewing size solution 328 can be identified by maximizing Equation 4 relative to alternative configurations. Although Equation 4 uses a minimum height A and a minimum width B, alternative embodiments can use a maximum height, a maximum width, an average height, an average width, a less than average height, a less than average width, or different measurements.

The greedy touch sensitivity solution 334 can be calculated based on MART values for each device of the plurality of devices and the location of each device of the plurality of devices in the respective configuration. In some situations, improved touch sensitivity is desirable towards the middle of a display and less necessary towards the edges of a display. For example, in video games, screen touch commands most often occur towards the middle of the display rather than on the edges. The greedy touch sensitivity solution 334 can be calculated according to Equation 5:

Touch Sensitivity (TS)=$\Sigma$grid_weight*grid_MART  Equation 5:

In Equation 5, the MART values for respective devices can be retrieved from device profiles 304. MART values are based on a difference in time between activation of a force sensitive resistor configured to receive a touch input and activation of a light sensitive resistor configured to output a response to the touch input. In different situations, larger MART values can indicate higher speed, whereas in other situations, larger MART values can indicate slower speed, depending on how the values are presented. For the purposes presented in examples below, assume higher MART values indicate faster speeds.

Grid weights can be predefined (e.g., with devices closer to the middle of the configuration having a higher weight relative to devices closer to the edge of the configuration), derived from information in content profile 306 (e.g., information indicating where touch sensitive aspects of the content are displayed), and/or derived from user preferences 308. In some embodiments, grid weights are based on an observed, predicted, or predefined degree of use of the respective grid elements with highly utilized grid elements having a higher weight and less utilized grid elements having a lesser weight. Greedy touch sensitivity solution 334 can be the configuration that maximizes Equation 5 relative to other solutions. In some embodiments, greedy touch sensitivity solution 334 can also be described as a tactile quality gradient.

Thus, each of the operations 310, 316, 322, 328, and 334 identifies a configuration based on a single parameter, regardless of how the other parameters are affected. After identifying the greedy solution configurations 310, 316, 322, 328, and 334, a total score accounting for all five parameters are calculated for each of the greedy solution configurations 310, 316, 322, 328, and 334. Total scores 312, 318, 324, 330, and 336 can be based on, for example, Equation 6:

Total_Score=$w_1f_1(\Delta_{AR})+w_2f_2(I)+w_3f_3(RS)+w_4f_4(VS)+w_5f_5(TS)$  Equation 6:

In Equation 6, $w_1$, $w_2$, $w_3$, $w_4$, and $w_5$ refer to respective weight factors for each of the parameters. In Equation 6, $f_1$, $f_2$, $f_3$, $f_4$, and $f_5$ refer to respective functions applied to each of the parameters in order to score, normalize, and/or combine each of the respective parameters. For example, a smaller difference in aspect ratio (e.g., Equation 1) relates to an improved display, thus the function $f_1$ can be an inverse function or other function generating an increasing output (e.g., higher score) from a decreasing input (e.g., smaller change in aspect ratio). In contrast, a larger total viewing size is desirable, so function $f_4$ can be a function generating increasing outputs (e.g., higher score) from increasing inputs (e.g., larger viewing sizes).

In embodiments, weighting parameters $w_1$, $w_2$, $w_3$, $w_4$, and $w_5$ can be based on information in content profile 306 or user preferences 308. Regardless of whether the weighting is equal or unequal between respective parameters, the sum of the weights is equal to one.

In embodiments where scores are normalized, the normalized scores can be calculated by subtracting a minimum observed value from the current value and dividing the difference by the maximum observed value less the minimum observed value.

Thus, score 312 calculates an overall score for the greedy aspect ratio solution 310 based on aspect ratio, internal borders, resolution shift, viewing size, and touch sensitivity of the greedy aspect ratio solution 310 configuration. The scores generated in 312, 318, 324, 330, and 336 can use all of, some of, or variations of Equations 1-5 discussed above, with values from each of the Equations normalized with respect to other values from other equations, and with each parameter weighted equally or unequally.

After generating total scores 312, 318, 324, 330, and 336 accounting for all parameters for each greedy solution 310, 316, 322, 328, and 334, local replacement is performed in operations 314, 320, 326, 332, and 338. Local replacement can include changes in orientation for any device in the configuration and/or exchanges of position for any two devices in the configuration. Local replacements can be random, predefined, based on improvements in a next highest weighted parameter, or based on other factors.

After performing local replacements 314, 320, 326, 332, and 338, updated scores are again calculated in 312, 318, 324, 330, and 336 for the updated configuration in light of the local replacements. Any number of iterations between local replacement and calculating updated scores can be performed. In some embodiments, in order to improve efficiency and processing speed, a predefined number (e.g., 3, 5, etc.) of local replacements are performed. In some embodiments, the predefined number of local replacements is based on the number of devices available for the configuration. For example, for a plurality of devices N, the number of local replacements may be equal to N, or equal to the square root of N rounded to the nearest whole number, or a different function based on N.

Operation 340 selects a best score from the scores calculated in multiple iterations of operations 312, 318, 324, 330, and 336. In operation 342, guidelines (e.g., device identifiers 102, orientation indicators 104, adjacent device identifiers 106 of FIG. 1B) are generated for the configuration selected in operation 340. The guidelines generated in operation 342 can be presented on respective devices (e.g., as discussed in operation 204 of FIG. 2 and shown in FIG. 1B).

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4:
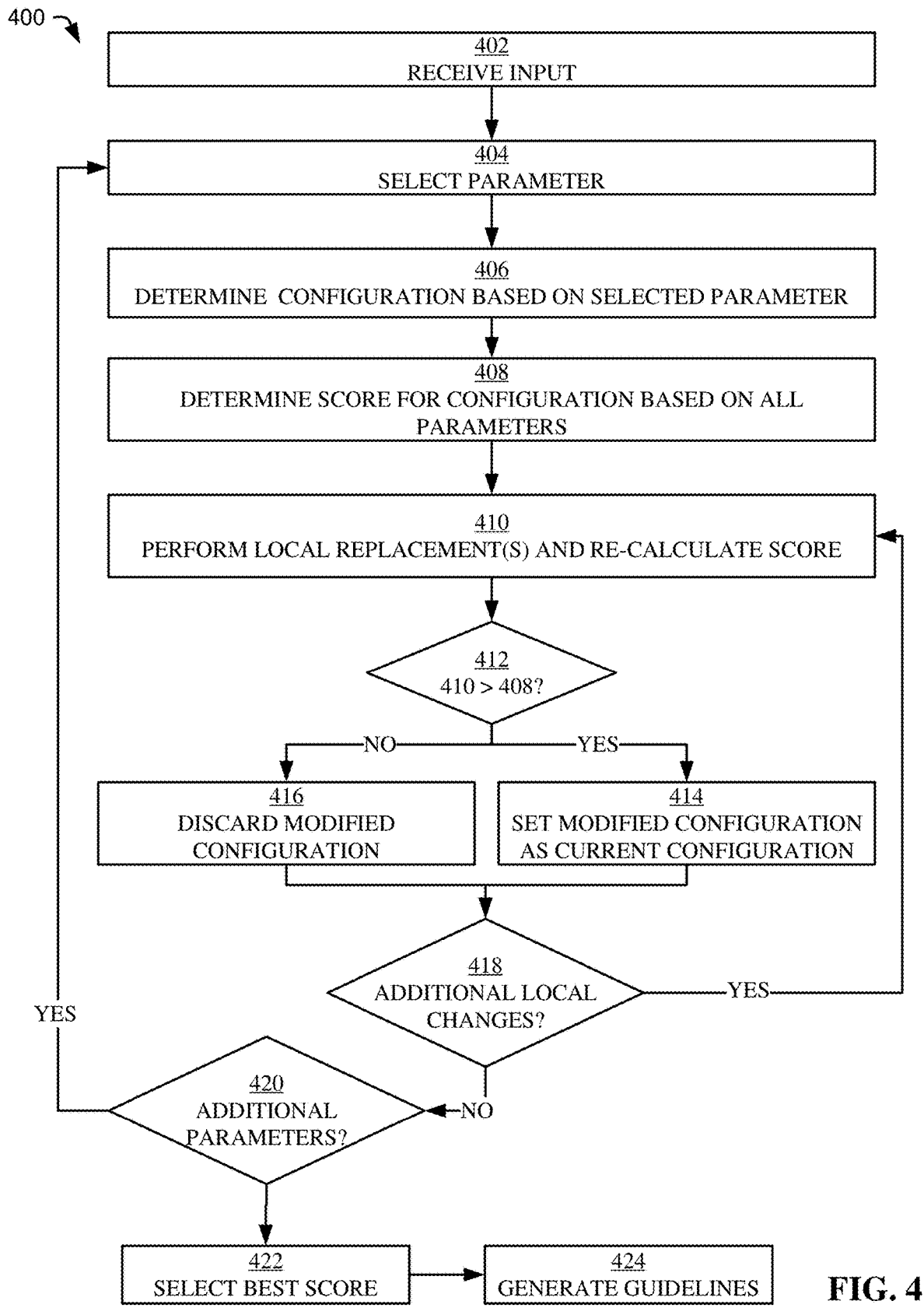
FIG. 4 illustrates a flowchart of an example method for determining a configuration of a plurality of devices using iterative processing, in accordance with embodiments of the present disclosure.

Referring now to FIG. 4, illustrated is a flowchart of an example method for iteratively determining a configuration, in accordance with embodiments of the present disclosure. In some embodiments, the method 400 is a sub-method of operation 202 of FIG. 2. The method 400 illustrates functionality that can be incorporated into computer-readable and processor executable program code. In various embodiments, the method 400 is implemented by a processor executing computer-readable program instructions, by a configuration manager (e.g., configuration manager 500 of FIG. 5), or by a different configuration of hardware and/or software.

Operation 402 includes receiving input such as device profiles (e.g., device profiles 304 of FIG. 3), content profiles (e.g., content profiles 306 of FIG. 3), and/or user preferences (e.g., user preferences 308 of FIG. 3).

Operation 404 includes selecting a parameter. Parameters can include, but are not limited to, aspect ratio, internal borders, resolution shift, viewing size, and touch sensitivity.

Operation 406 includes determining a configuration based on the selected parameter. Operation 406 can select a configuration that is optimized according to the selected parameter (e.g., an aspect ratio closest to a desired aspect ratio, a minimized area of internal borders, a minimized resolution shift between adjacent devices, a maximized viewing size, a best touch sensitivity at highly utilized portions of the display, etc.). Operation 406 can be consistent with operations 310, 316, 322, 328, and/or 334 of FIG. 3.

Operation 408 includes determining a current score for the current configuration determined in operation 404 and accounting for all the parameters including the parameter selected in operation 402. Operation 408 can be consistent with operations 312, 318, 324, 330, and/or 336 of FIG. 3.

Operation 410 includes performing a local replacement (e.g., position exchanges, orientation changes, etc.) for one or more devices in the plurality of devices in the determined configuration and calculating an updated score for the updated configuration. Operation 410 can be consistent with operations 314, 320, 326, 332, 338 and operations 312, 318, 324, 330, 336 of FIG. 3.

Operation 412 determines if the updated score from operation 410 is larger than the current score from operation 408. In the event that the updated score is not larger (e.g., NO at decision block 412), the method 400 proceeds to discard the updated configuration from operation 410 in operation 416. In the event that the updated score is larger (e.g., YES at decision block 412), the method 400 proceeds to set the updated configuration as the current configuration in operation 414.

Regardless of whether the method 400 proceeds through operation 414 or operation 416, the method 400 proceeds to operation 418 and determines if there are additional local replacements. Any number of iterations between 410-418 can be performed. In some embodiments, and to improve efficiency and processing speed, a predefined number (e.g., 3, 5, etc.) of local replacements are performed. In some embodiments, the predefined number of local replacements is based on the number of devices available for the configuration. For example, for a plurality of devices N, the number of local replacements may be equal to N, or equal to the square root of N rounded to the nearest whole number, or a different function based on N.

In the event that there are additional local replacements (e.g., YES at decision block 418), the method 400 returns to operation 410 and generates another updated configuration based on another local replacement and proceeds again through operations 410-418. In the event that there are no additional local replacements (e.g., NO at decision block 418), the method 400 proceeds to operation 420.

Operation 420 determines if there are additional parameters. In the event that there are additional parameters (e.g., YES at decision block 420), the method 400 returns to operation 404 and selects a new parameter. The method 400 then again proceeds through operations 406-420 for each additional parameter.

In the event that there are no additional parameters (e.g., NO at decision block 420), the method 400 proceeds to operation 422 and selects a best score. The best score can be a highest score, a lowest score, a highest ranking, or a different mechanism for calculating a score indicating a preferred configuration.

Operation 424 generates guidelines for the configuration selected in operation 422 (e.g., device identifiers 102, orientation indicators 104, and adjacent device identifiers 106 of FIG. 1B). The guidelines generated in operation 424 can be presented on respective devices (e.g., as discussed in operation 204 of FIG. 2 and shown in FIG. 1B).

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 5:
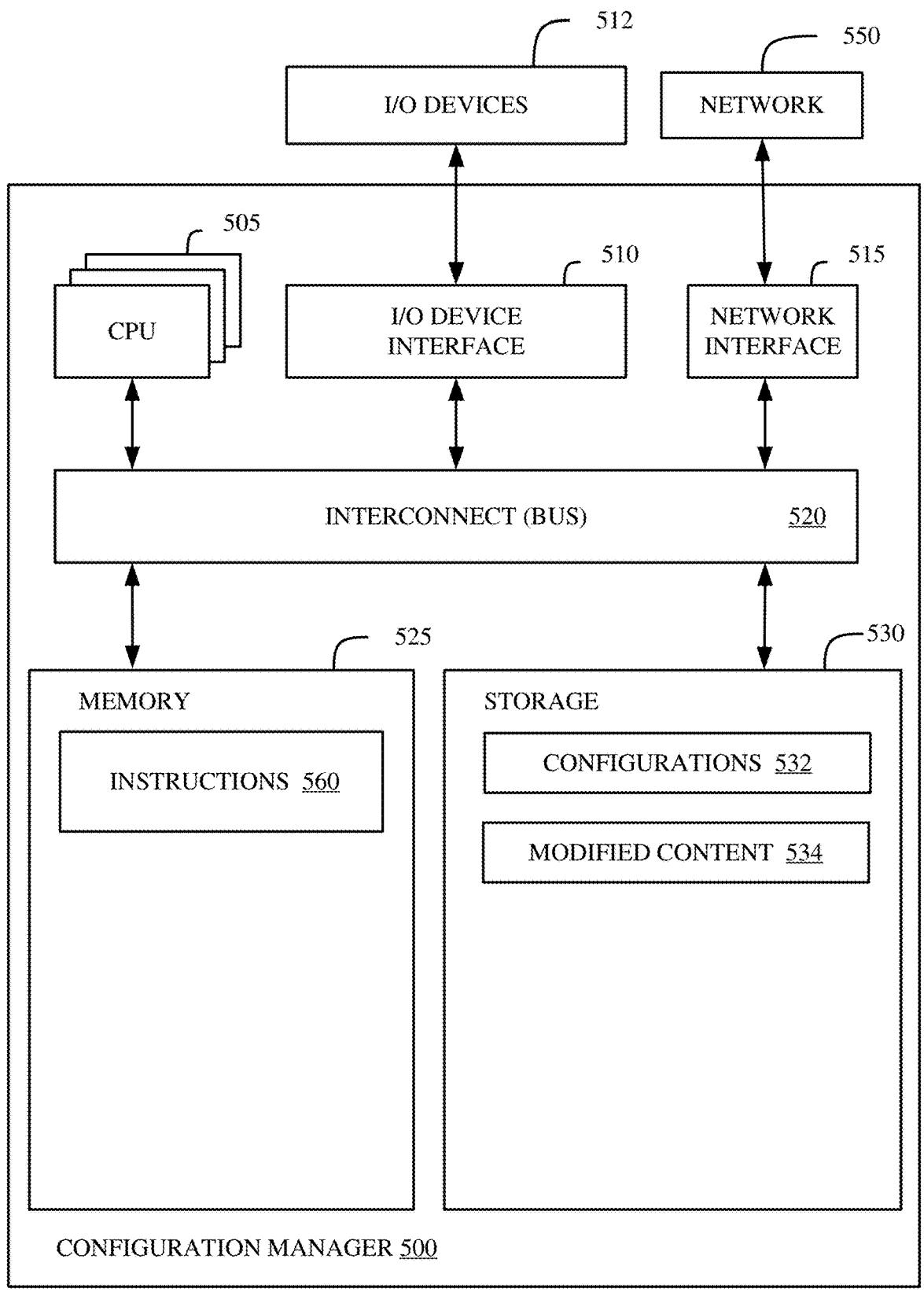
FIG. 5 illustrates a block diagram of an example configuration manager, in accordance with embodiments of the present disclosure.

FIG. 5 illustrates a block diagram of an example configuration manager 500 in accordance with some embodiments of the present disclosure. In various embodiments, configuration manager 500 can perform the methods described in FIGS. 2-4 and/or the functionality discussed in FIG. 1B. In some embodiments, configuration manager 500 provides instructions for the aforementioned methods and/or functionalities to a client machine such that the client machine executes the method, or a portion of the method, based on the instructions provided by the configuration manager 500. In some embodiments, configuration manager 500 comprises software executing on hardware incorporated into a plurality of devices.

The configuration manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). The storage 530 is generally included to be representative of a non-volatile memory, such as a hard disk drive, solid state device (SSD), removable memory cards, optical storage, or flash memory devices. In an alternative embodiment, the storage 530 can be replaced by storage-area-network (SAN) devices, the cloud, or other devices connected to the configuration manager 500 via the I/O device interface 510 or a network 550 via the network interface 515.

In some embodiments, the memory 525 stores instructions 560 and the storage 530 stores configurations 532 and modified content 534. However, in various embodiments, the instructions 560, configurations 532, and modified content 534 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all of, any of the methods of FIGS. 2-4 and/or any of the functionality discussed in FIG. 1B.

Configurations 532 can include scores for various configurations and/or guidelines for instructing a user to arrange a plurality of devices into a given configuration.

Modified content 534 can store content modified to increase compatibility with a selected configuration 532.

In various embodiments, the I/O devices 512 include an interface capable of presenting information and receiving input. For example, I/O devices 512 can present information to a user interacting with configuration manager 500 and receive input from the user.

Configuration manager 500 is connected to the network 550 via the network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
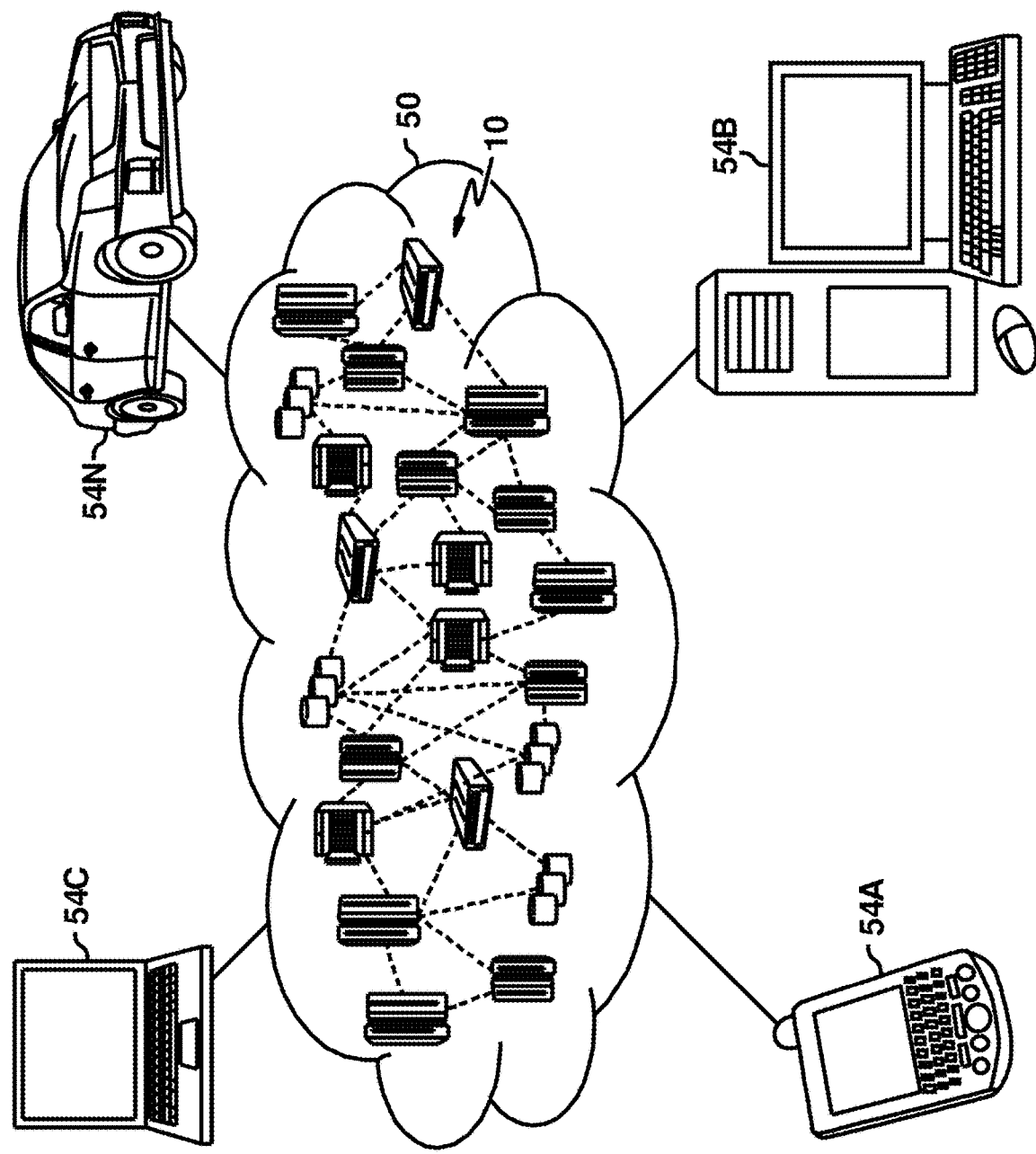
FIG. 6 depicts a cloud computing environment, according to some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
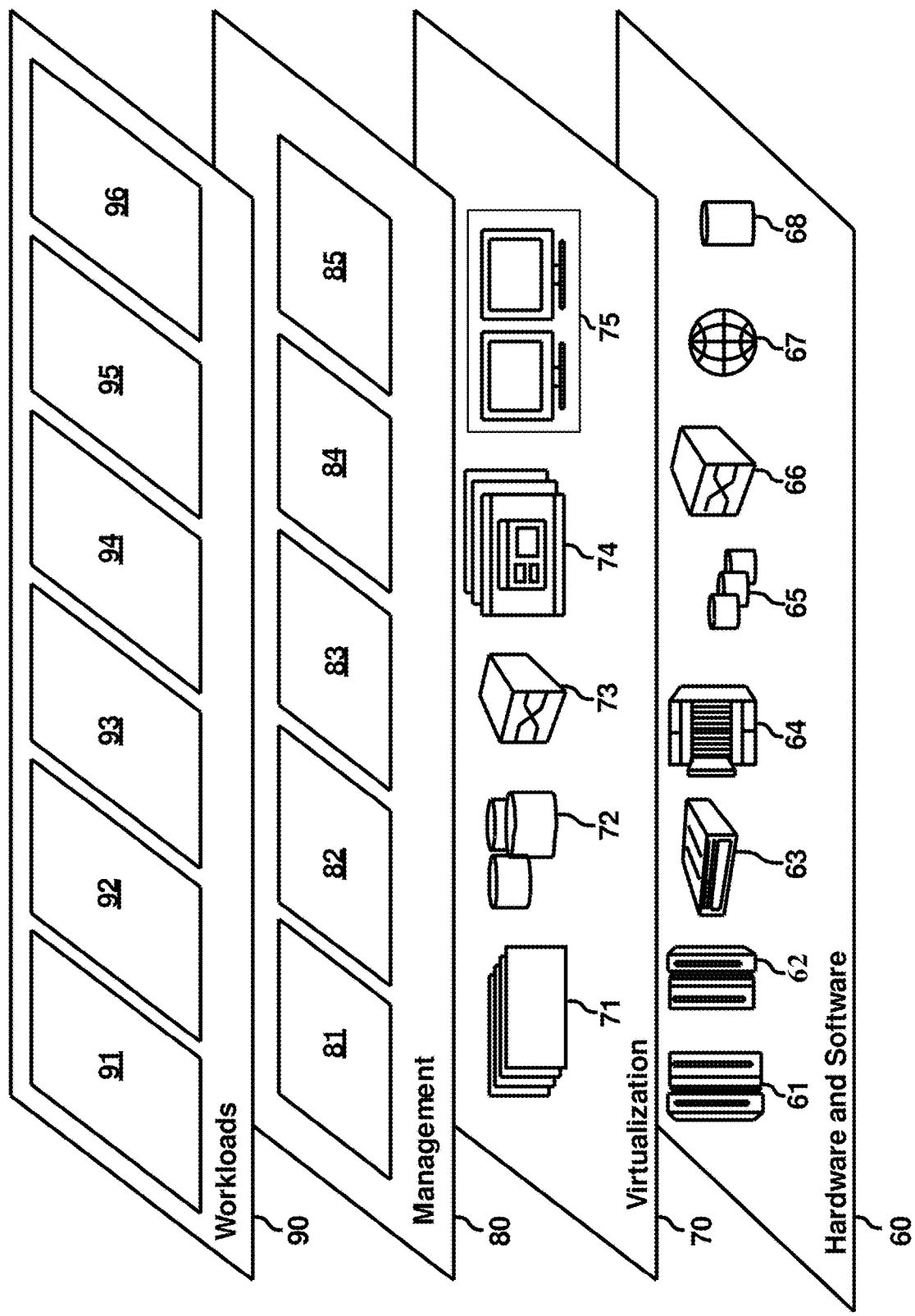
FIG. 7 depicts abstraction model layers, according to some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-device display management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any subset of the methods described with respect to FIGS. 2-4 and/or the functionality discussed in FIG. 1B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   determining a first configuration for displaying first content on a plurality of devices, wherein the first configuration is based on a collective viewing size of the first configuration, an aspect ratio of the first configuration, a resolution shift of the first configuration, an internal border area of the first configuration, and a tactile quality gradient of the first configuration; and
   displaying guidelines on respective devices of the plurality of devices for arranging the plurality of devices in the first configuration, wherein displaying guidelines includes displaying, on a first device of the plurality of devices, a first device identifier, an orientation indicator, and an adjacent device indicator, wherein the adjacent device indicator includes another device identifier and is located near a first border of the first device that is adjacent to another border of the other device in the first configuration.

2. The method of claim 1, further comprising:
   modifying the first content to create second content, wherein the second content is configured for presentation on the plurality of display device in the first configuration; and
   displaying the second content on the plurality of display devices arranged in the first configuration.

3. The method of claim 2, wherein modifying the first content includes changing an aspect ratio of the first content.

4. The method of claim 1, wherein the viewing size is based on a height of the first configuration multiplied by a width of the first configuration.

5. The method of claim 1, wherein the aspect ratio of the first configuration is based on a difference between an ideal aspect ratio of the first content and a quotient of a minimum height of the first configuration divided by a minimum width of the first configuration.

6. The method of claim 1, wherein the resolution shift of the first configuration is based on a sum of squared differences of resolutions for adjacent devices in the first configuration.

7. The method of claim 1, wherein the internal border area is based on an external border area of the plurality of devices in the first configuration subtracted from a total border area of the plurality of devices.

8. The method of claim 1, wherein the tactile quality gradient is based on Minimum App Response Time (MART) values of respective devices of the plurality of devices.

9. The method of claim 8, wherein respective grid elements of a collective screen created by the first configuration are weighted according to a degree of use for respective grid elements, and wherein the tactile quality gradient is based on a sum of products of respective grid weights multiplied by respective MART values.

10. The method of claim 1, wherein the device identifier is selected from a group consisting of: a numeric identifier, a textual identifier, and an alphanumeric identifier.

11. The method of claim 1, wherein the device identifier is selected from a group consisting of: a color, and an image.

12. The method of claim 1, wherein the orientation indicator comprises a rectangle.

13. The method of claim 1, wherein the orientation indicator comprises an image.

14. The method of claim 1, wherein the adjacent device indicator is further configured to indicate an amount of the first border of the first device that overlaps the other border of the other device.

15. The method of claim 1, further comprising displaying, on the first device, an indication that the first device is properly aligned in the first configuration.

16. The method of claim 1, wherein the plurality of devices includes at least three devices, wherein at least two devices of the plurality of devices have different screen dimensions.

17. A computer program product comprising program instructions stored on a computer readable storage medium, wherein the computer readable storage medium is not a transitory signal per se, the program instructions executable by a processor to cause the processor to perform a method comprising:
   determining a first configuration for displaying first content on a plurality of devices, wherein the first configuration is based on a collective viewing size of the first configuration, an aspect ratio of the first configuration, a resolution shift of the first configuration, an internal border area of the first configuration, and a tactile quality gradient of the first configuration; and
   displaying guidelines on respective devices of the plurality of devices for arranging the plurality of devices in the first configuration, wherein displaying guidelines includes displaying, on a first device of the plurality of devices, a first device identifier, an orientation indicator, and an adjacent device indicator, wherein the adjacent device indicator includes another device identifier and is located near a first border of the first device that is adjacent to another border of the other device in the first configuration.

18. The computer program product of claim 17, wherein the program instructions were downloaded over a network from a remote server.

19. The computer program product of claim 17, wherein the computer readable storage medium storing the program instructions is a server data processing system, and wherein the program instructions are downloaded over a network to a remote data processing system for use in a remote computer readable storage medium with the remote data processing system.

20. A system comprising:
   a plurality of devices arranged in a first configuration for displaying content on the plurality of devices, the plurality of devices including a first device having a first width and a first length situated adjacent to a second device having a second width less than the first width and a second length less than the first length;

wherein the first device presents a first device identifier, a first orientation indicator, and a first adjacent device indicator, wherein the first adjacent device indicator includes a second device identifier corresponding to the second device, wherein the first adjacent device identifier is situated at a first border of the first device that is adjacent to a second border of the second device; and wherein the second device presents the second device identifier, a second orientation indicator, and a second adjacent device identifier, wherein the second adjacent device identifier includes the first device identifier, and wherein the second adjacent device identifier is situated at the second border of the second device that is adjacent to the first border of the first device.

* * * * *